UNITED STATES PATENT OFFICE.

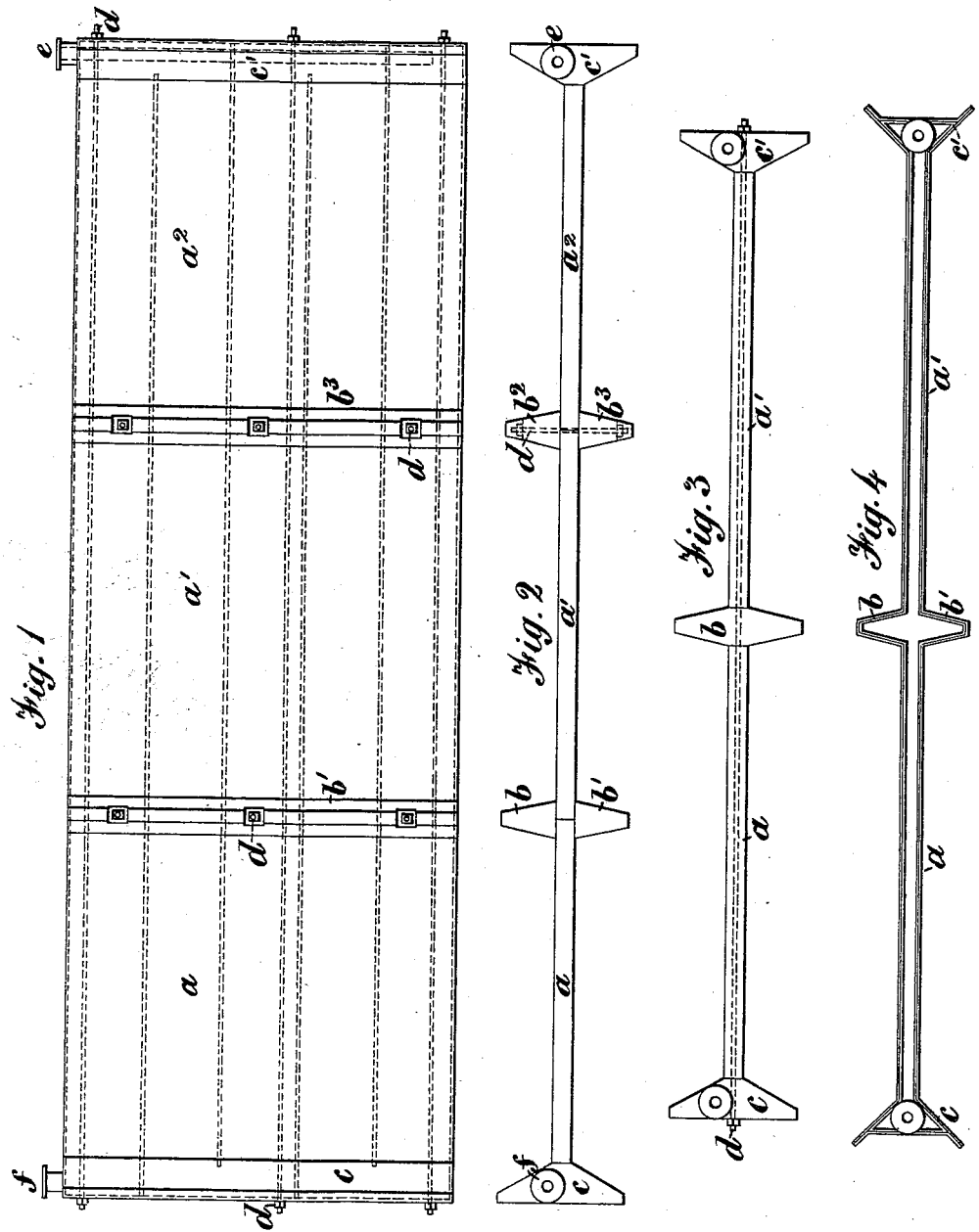

JOSHUA SIDDELEY AND FREDERICK N. MACKAY, OF LIVERPOOL, ENGLAND.

IMPROVEMENT IN CELLS FOR THE TANKS OF ICE-MAKING APPARATUS.

Specification forming part of Letters Patent No. 217,647, dated July 15, 1879; application filed May 20, 1878; patented in England, May 10, 1875.

*To all whom it may concern:*

Be it known that we, JOSHUA SIDDELEY and FREDERICK NOEL MACKAY, both of Liverpool, in the county of Lancaster, England, have invented a new and useful Improvement in Cells to be Used in the Tanks of Ice-Making Apparatus, (for which English Patent No. 1,726 of 1875 was granted to us,) of which the following is a specification.

This invention relates to cells through which brine or other fluid, at a temperature below freezing-point, is caused to circulate, and which are placed in a tank containing water to be frozen.

Cells for the above purpose have generally been made with parallel sides, so that the said cells have had to be made of the size that it was required that the finished blocks should be, although in some cases large cells have been used for making several blocks by attaching dividing-pieces to such cells. However, there has been great difficulty in thawing off the blocks formed, on account of the said blocks sticking fast to such dividing-pieces.

Now, the object of our invention is to simplify devices for obviating the above difficulty. For this purpose we make, construct, or form cells with hollow dividing-pieces, which have open communication with the body of the cells, so that the brine or refrigerating-fluid which circulates through the cells shall also circulate continuously through the hollow dividing-pieces. Therefore, when warm fluid is caused to pass through the cells it also passes continuously through the dividing-pieces and thaws off the blocks of ice.

We prefer to use this invention in combination with the invention of cells with hollow end pieces, for which we apply for United States Letters Patent simultaneously with this application.

On the accompanying sheet of drawings, Figure 1 is a side elevation, and Fig. 2 a plan view, of a cast-iron cell constructed in accordance with our invention. $a\ a^1\ a^2$, body of cell; $b\ b^1\ b^2\ b^3$, hollow dividing-pieces; $c\ c'$, hollow end pieces, the whole being held together by bolts $d$; $e\ f$, entrance and exit pipes for brine or other refrigerating-fluid.

Fig. 3 is a plan view of another construction of cast-iron cell. $a\ a^1$, body of cell; $b$, hollow dividing-piece; $c\ c'$, hollow end pieces, the whole being held together by bolts $d$.

Fig. 4 is a plan view of a wrought-iron cell. $a\ a^1$, body of cell; $b\ b^1$, hollow dividing-pieces; $c\ c'$, hollow end pieces. This cell is formed of wrought-iron plates brazed together.

It will be obvious that the parts of wrought-iron cells may be riveted, welded, or otherwise fastened together, and that cast-iron cells may be cast in one piece.

We are aware that cells for refrigerators have been made from tubes having their outside sectional outline in the form of a parallelogram, and that said cells have been provided with hollow dividing-ribs, which communicate with independent tubular frames surrounding the edges of the cells, and do not claim such subject-matter, as with such construction the refrigerant does not pass through the dividing-pieces, but an independent and separate circulation has to be established.

We are also aware that ice-machines have heretofore been devised wherein the liquid to be frozen has been contained in pans having hollow pyramidal projections, said pans being placed within the expansion-chamber, and the hollow pyramidal projections continuous with the expansion-chamber, so that the same refrigerant circulated therein, and do not claim the same, as the devices are practically limited by their construction to the use of air or like refrigerant, which will not affect the water or liquid being frozen, while in our case the cells are closed, and can be used with various liquids and gaseous refrigerants.

What we claim is—

A cell for the tanks of ice-making apparatus, having hollow dividing-pieces continuous with the cavity of the cell, through which and the body of the cells the same fluid circulates.

JOSHUA SIDDELEY.
FREDK. N. MACKAY.

Witnesses:
J. J. KING,
J. JOHNSON.